(12) United States Patent
Foiera et al.

(10) Patent No.: US 10,742,437 B2
(45) Date of Patent: Aug. 11, 2020

(54) METHOD FOR EXCHANGING INFORMATION BETWEEN A HOUSEHOLD APPLIANCE AND A MOBILE DEVICE

(71) Applicant: ELECTROLUX APPLIANCES AKTIEBOLAG, Stockholm (SE)

(72) Inventors: Riccardo Foiera, Forli (IT); Gianluca Venturini, Forli (IT); Alex Viroli, Forli (IT); Massimo Nostro, Forli (IT); Laurent Jeanneteau, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 16/347,669

(22) PCT Filed: Oct. 4, 2017

(86) PCT No.: PCT/EP2017/075228
§ 371 (c)(1),
(2) Date: May 6, 2019

(87) PCT Pub. No.: WO2018/086803
PCT Pub. Date: May 17, 2018

(65) Prior Publication Data
US 2019/0319816 A1    Oct. 17, 2019

(30) Foreign Application Priority Data
Nov. 9, 2016 (EP) ..................... 16197962

(51) Int. Cl.
*G06F 15/177* (2006.01)
*H04L 12/28* (2006.01)
(Continued)

(52) U.S. Cl.
CPC ............ *H04L 12/2807* (2013.01); *G06T 7/73* (2017.01); *G08C 23/04* (2013.01); *H04L 12/282* (2013.01);
(Continued)

(58) Field of Classification Search
CPC ............... H04L 12/2807; H04L 12/282; H04L 12/2823; H04L 2012/285; G06T 7/73; G08C 23/04
See application file for complete search history.

(56) References Cited

U.S. PATENT DOCUMENTS

| | | |
|---|---|---|
| 2003/0170033 A1 | 9/2003 | Peterson et al. |
| 2012/0128267 A1* | 5/2012 | Dugan ................... H04L 67/36 382/321 |

(Continued)

FOREIGN PATENT DOCUMENTS

| | | |
|---|---|---|
| EP | 2713229 A1 | 4/2014 |
| WO | 2014107681 | 7/2014 |

OTHER PUBLICATIONS

International Search Report and Written Opinion in PCT/EP2017/075228 dated Dec. 7, 2017, 8 pages.
(Continued)

*Primary Examiner* — Jonathan A Bui
(74) *Attorney, Agent, or Firm* — Pearne & Gordon LLP

(57) ABSTRACT

The invention relates to a method for exchanging information between a household appliance (1) and a mobile device (2), the method comprising the steps of: providing optical information at a graphical user interface (3) of the household appliance (1) (S10); preferably, aligning the mobile device (2) with respect to the household appliance (1) based on one or more markers (4) displayed at a graphical user interface (5) of the mobile device (2) or based on a time-invariant portion of provided optical information (S11); receiving (Continued)

optical information at the mobile device (2) by capturing said optical information provided at the household appliance (1) by a camera (6) of the mobile device (2) (S12); processing said received optical information at the mobile device (1) in order to derive an information message included in said received optical information (S13); providing said information message or information associated with said information message at a user interface of the mobile device (2) (S14).

21 Claims, 5 Drawing Sheets

(51) Int. Cl.
  *G06T 7/73* (2017.01)
  *G08C 23/04* (2006.01)
(52) U.S. Cl.
  CPC .................. *H04L 12/2823* (2013.01); *G06T 2207/30204* (2013.01); *H04L 2012/285* (2013.01)

(56) References Cited

U.S. PATENT DOCUMENTS

| | | | |
|---|---|---|---|
| 2012/0132702 A1* | 5/2012 | Yuan | G06F 11/2294 235/375 |
| 2013/0136363 A1* | 5/2013 | Na | G06K 9/00456 382/190 |
| 2016/0196484 A1* | 7/2016 | Ciavatta | G06K 7/1417 235/462.1 |
| 2016/0323108 A1* | 11/2016 | Bhogal | H04L 63/123 |
| 2018/0012072 A1* | 1/2018 | Glaser | H04L 12/2809 |
| 2018/0247287 A1* | 8/2018 | Narasimhan | G06Q 20/12 |
| 2018/0247298 A1* | 8/2018 | Khan | G06Q 20/20 |
| 2019/0236941 A1* | 8/2019 | Lindsay | G08G 1/0145 |

OTHER PUBLICATIONS

European Office action for application No. 16197962.0, dated Jun. 8, 2020, 5 pages.

* cited by examiner

METHOD FOR EXCHANGING INFORMATION BETWEEN A HOUSEHOLD APPLIANCE AND A MOBILE DEVICE

The present invention relates generally to the field of household appliances. More specifically, the present invention is related to a method for exchanging information between a household appliance and a mobile device.

BACKGROUND OF THE INVENTION

Household appliances, e.g. stoves or baking ovens often comprise a graphical user interface (GUI) for providing information to a user, for example operational information or warnings. However, said GUIs are often limited in their capacity, i.e. only a limited amount of information can be provided to a user or service technician.

SUMMARY OF THE INVENTION

It is an objective of embodiments of the present invention to provide a method for exchanging information between a household appliance and a mobile device which enables a more comprehensive information provision by using user interfaces provided by mobile devices. The objective is solved by the features of the independent claims. Preferred embodiments are given in the dependent claims. If not explicitly indicated otherwise, embodiments of the invention can be freely combined with each other.

According to an aspect, the invention relates to a method for exchanging information between a household appliance and a mobile device. The method comprises the steps of:
  providing optical information at a graphical user interface of the household appliance;
  preferably, aligning the mobile device with respect to the household appliance based on one or more markers displayed at a graphical user interface of the mobile device or based on a time-invariant portion of provided optical information receiving optical information at the mobile device by capturing said optical information provided at the household appliance by a camera of the mobile device;
  processing said received optical information at the mobile device in order to derive an information message included in said received optical information;
  providing said information message or information associated with said information message at a user interface of the mobile device.

Advantageously, based on upper-mentioned method steps it is possible to use a limited GUI at the household appliance for transferring information to the mobile device. Said information is processed by the mobile device in order to obtain a more complex and/or comprehensive information message for the respective user.

According to embodiments, said one or more markers comprise a frame or segments of a frame. Thereby a portion of the GUI of the mobile device is defined in which a certain information received by the camera of the mobile device, in the following referred to as optical reference information, has to be aligned in order to be able to process the received optical information with the required accuracy.

According to embodiments, said one or more markers are corner markers. Said corner markers may comprise one or more pairs of markers which are arranged at opposite corners of a portion of the GUI of the mobile device. Said corner markers may define a square, rectangular or polygonal portion at the GUI in which certain optical reference information has to be arranged during said alignment process.

According to embodiments, the step of aligning comprises capturing of optical reference information at the household appliance by means of said camera of the mobile device and arranging the mobile device and/or performing a zoom action at the mobile device such that said optical reference information is displayed at the graphical user interface of the mobile device and said optical reference information (ORI) is fitted into said one or more markers. For example, said alignment may be performed by a movement of the mobile device such that the optical reference information in correctly aligned within the one or more markers and covers the whole or at least a significant portion of the GUI portion surrounded or indicated by the one or more markers. Thereby it is possible to enable information processing with a desired accuracy.

According to embodiments, said optical reference information comprises a fixed area of the graphical user interface of the household appliance or reference information is temporarily displayed at the graphical user interface of the household appliance. So in other words, the optical reference information can be defined by permanently or only temporarily available information. For example, optical reference information may be the outer contour of a seven segment display.

According to embodiments, the optical reference information is built by a fixed, permanently existent marking, specifically an imprint, an embossing or a logo. Said marking may be arranged at a certain position with respect to the GUI portion which shows the optical information to be received by the mobile device. Therefore it is possible to use said marking for aligning the mobile device in order to achieve the desired information recognition accuracy.

According to embodiments, during said aligning, a graphical user interface portion of the household appliance, which shows said optical information, is displayed at the graphical user interface of the mobile device and is fitted into an area of said graphical user interface of the mobile device, said area being defined by said one or more markers. So, the optical information to be received is directly used for aligning the mobile device.

According to embodiments, said fixed, permanently existent marking is fitted into an area of the graphical user interface of the mobile device which is defined by said one or more markers. So, the marking which may be easily recognizable for the respective user/technician is used for supporting said alignment.

According to embodiments, said optical information displayed at a graphical user interface of the household appliance is time-invariant. So, in other words, a fixed information code may be displayed at the GUI of the household appliance which is received and processed by the mobile device.

According to other embodiments, said optical information displayed at the graphical user interface of the household appliance includes time-varying information. In other words, an information sequence may be displayed at the GUI. Said mobile device may capture multiple images and/or a video sequence of said time-varying information in order to derive said information message out of said multiple images and/or a video sequence. In case of using a display portion of the household appliance for providing said optical information, said display portion may provide binary-coded information (e.g. on/off switching of a seven segment display) or information using an advanced coding scheme (e.g.

selectively switching the bars of the seven segment display on/off in order to display different numbers or characters).

According to embodiments, said information received by the camera is processed in real time or quasi-real time into digital information. Said information processing may be controlled by an application installed at the mobile device.

According to embodiments, the graphical user interface of the household appliance comprises a seven segment display adapted to display one or more digits or one or more light emitting diodes which are used for providing said optical information. In case of using a light emitting diode, the information is provided to the mobile by switching said light emitting diodes on/off (on/off keying modulation). In case of using a seven segment display, either an on/off keying modulation or a more sophisticated coding scheme (e.g. selectively activating bars of the seven segment display) may be used.

According to embodiments, said derived information message comprises information regarding error codes, warnings or usage statistics. Thereby, troubleshooting performed by a technician may be simplified.

According to embodiments, processing said received optical information is started manually or automatically after aligning the mobile device. Said manual activation may be performed pressing a certain button or an area of a touch-sensitive display. An automatic start may be performed after recognizing that the mobile device is aligned properly.

According to embodiments, said optical information comprises a sequence of digitally coded information including error correction information. Based on said error correction information an error correction scheme may be implemented. Said error correction scheme may be, for example, a Hamming code. Based on said error correction information it is possible to recognize and fix transmission errors.

According to embodiments, information processing at the mobile device is synchronized to the information provision at the household appliance based on a dot-shaped portion of the seven segment display. For example, said dot-shaped portion of the seven segment display may provide a periodically appearing (blinking) optical signal which is used for recovering the synchronization of the frame structure, respectively, the synchronization of the data processing within the mobile device.

According to embodiments, said optical information comprise a sequence of digitally coded information which is transmitted based on a frame structure comprising multiple time slots in which data segments of the digitally coded information are transmitted. A single frame may comprise two or more data segments, each data segment being included in a time slot. A data segment may include to or more bits of digital information to be transmitted. Preferably, a data segment includes digital information which is included in a single digit displayed at a certain point of time at the seven segment display. So, in other words, each time slot of the frame structure refers to a certain digit displayed at a certain point of time at the seven segment display.

According to embodiments, a first subset of bars of a seven segment display is used for providing optical reference information (ORI) which is used for alignment purposes. For example, the first subset of bars is displayed continuously at the GUI of the household appliance thereby providing reference information to the mobile device which can be used to determine the orientation of the one or more digits of the seven segment display and derive information where said digital information to be transmitted is included in the captured optical information.

According to embodiments, a second subset of bars of a seven segment display, specifically two or more bars of a seven segment display are used for providing digitally coded information at the graphical user interface of the household appliance. For example, the bars of the seven segment display are selectively switched on/switched off, wherein the state of a certain bar (on/off) represents a bit of digital information. Thereby, digital information can be extracted out of the captured optical information.

According to embodiments, one digit of the seven segment display provides two or more bits of digital information in a time slot of said frame structure. For example, the state of the seven segment display may change in synchronization with the time slots of the frame structure. The bits of digital information included in the current digit provided at the seven segment display may be associated with said time slot in which said digit has been provided at the GUI of the household appliance. Thereby, a sequence of digits provided at the seven segment display can be translated in a sequence of bits according to the frame structure.

According to embodiments, the mobile device extracts symbols included in the captured optical information based on an optical character recognition algorithm. More in detail, an OCR algorithm may recognize one or more digits included in an image captured by the camera of the mobile device. Said recognized image may be translated into digital information (e.g. a sequence of bits).

According to a further aspect, the invention relates to a household appliance comprising a graphical user interface for providing optical information. The household appliance may be adapted to exchange information with a mobile device based on a method according to one of the upper-mentioned embodiments.

The term "essentially" or "approximately" as used in the present disclosure means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
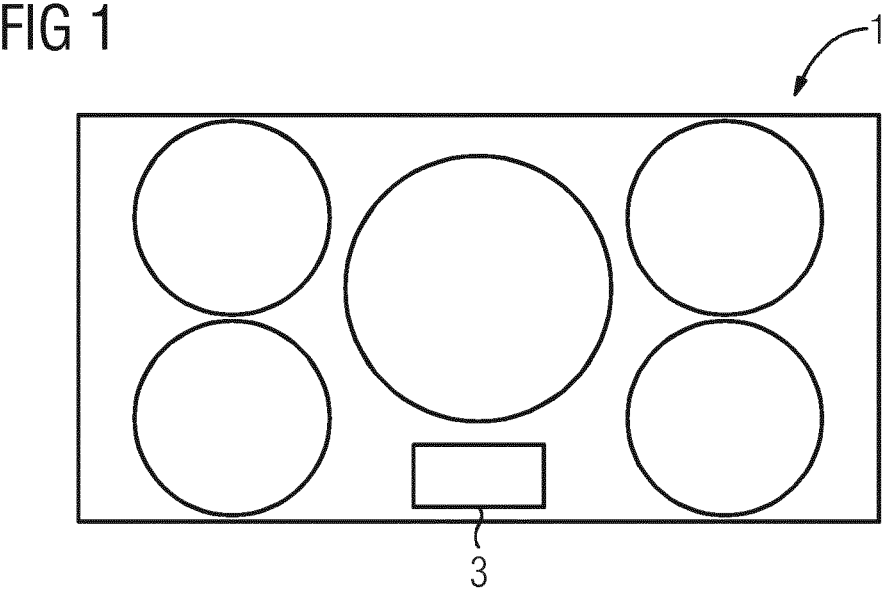
FIG. 1 shows an example schematic top view of a household appliance.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a schematic illustration of a household appliance 1, in the present case an electric cooker. However, a person skilled in the art may recognize that the present invention can be also included in other household appliances, e.g. baking ovens, dryers, dish washers, etc.

The household appliance 1 comprises a graphical user interface 3. For example, the graphical user interface (GUI) may comprise a display for providing optical information or may comprise a touch sensitive display for providing optical information as well as receiving instructions (on/off switching, varying heating power, operating a timer etc.) from a user by certain touch actions. According to embodiments, the GUI 3 may comprise one or more seven-segment-displays for providing one or more digits. Alternatively, the GUI 3 may be a digital screen or may comprise one or more light emitting diodes (LEDs) for said provision of information.

Figure 2:
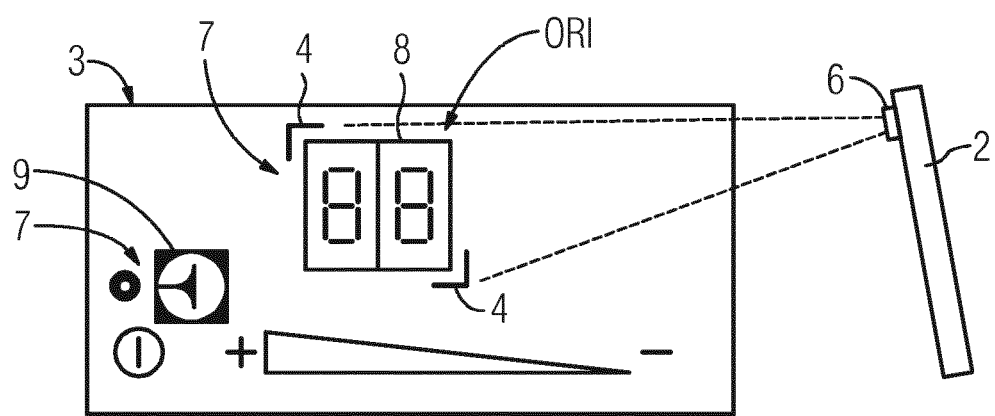
FIG. 2 shows an arrangement of a graphical user interface of a household appliance and a mobile device which receives example optical information from said graphical user interface.

FIG. 2 illustrates an embodiment of a GUI 3 of a household appliance 1 together with a mobile device 2 placed in proximity to the graphical user interface 3. The mobile device 2 may be, for example a smartphone, a tablet, a personal digital assistant PDA etc. Said mobile device 2 may also comprise a GUI 5, for example a touch-sensitive display and a camera 6 for capturing images and/or video sequences.

The GUI 3 of a household appliance 1 may be adapted to provide optical information at its GUI 3. In case that the GUI 3 only provides limited capabilities for displaying complex information, the information may be provided in a coded manner. For example, error codes may be displayed at the GUI 3. Alternatively, information is provided by a time-varying digital pattern, e.g. by switching LEDs on/off or using one or more seven-segment-displays which are controlled according to a certain code pattern. However, such coded information may not be directly understood by a user or technician. Therefore, a decoding operation may be necessary which is performed by said mobile device 2.

As mentioned before, said mobile device 2 comprises a camera 6. Said camera 6 can be used for capturing one or more images, respectively a video sequence of a portion of said GUI 3 providing said optical information. As shown in FIG. 2, based on the camera 6 at least a portion of said GUI 3 may be recorded by said camera 6. Recorded information may be displayed at the GUI 5 of the mobile device 2.

Figure 3:
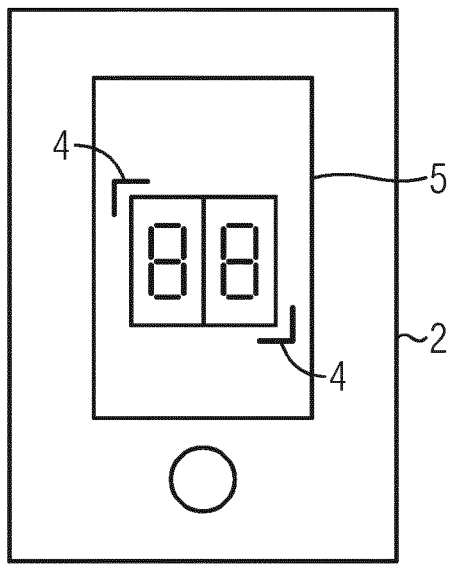
FIG. 3 shows a mobile device which is aligned properly for receiving optical information.

In order to enable a sufficiently accurate capturing of said optical information, a certain alignment process is performed. As shown in FIG. 3, one or more markers 4 may be displayed at the GUI 5. Said marker(s) may be, for example, a polygonal frame, a circle, an oval, sections of a frame, circle or oval etc. In the present embodiment, a pair of markers 4 are provided at diagonally opposite positions, said markers 4 being corner markers, preferably comprising an L-shape. Based on said marker(s) 4 it is possible to perform a desired alignment of the mobile device 2. "Aligning" according to the present invention refers to any process which leads to a correct positioning and or size adaption of an optical reference information ORI in a portion of the GUI 5 defined by said marker(s) 4. Specifically, "aligning" means position variations of the mobile device 2 and/or zoom actions performed at the mobile device 2.

Said optical reference information ORI can be built by any information available at the household appliance 1. More specifically, said optical reference information ORI can be temporary information displayed at the GUI 3 or can be a permanently existent information, e.g. a printing, embossing etc. In the example of FIG. 2, the seven segment display 8 builds said optical reference information ORI. However, according to other embodiments, also a logo 9 available at the household appliance 1 can be used as optical reference information ORI.

Based on the optical reference information ORI it is possible to align the mobile device 2 such that optical information to be received is available in a desired accuracy. FIG. 3 shows the GUI of the mobile device 2 at which the seven segment display 8 is aligned into the pair of markers 4. For example, said alignment has to be performed such that a certain portion or detail of the GUI 5 is fitted into the region defined by the one or more markers 4 (cf. FIG. 3).

Figure 4:
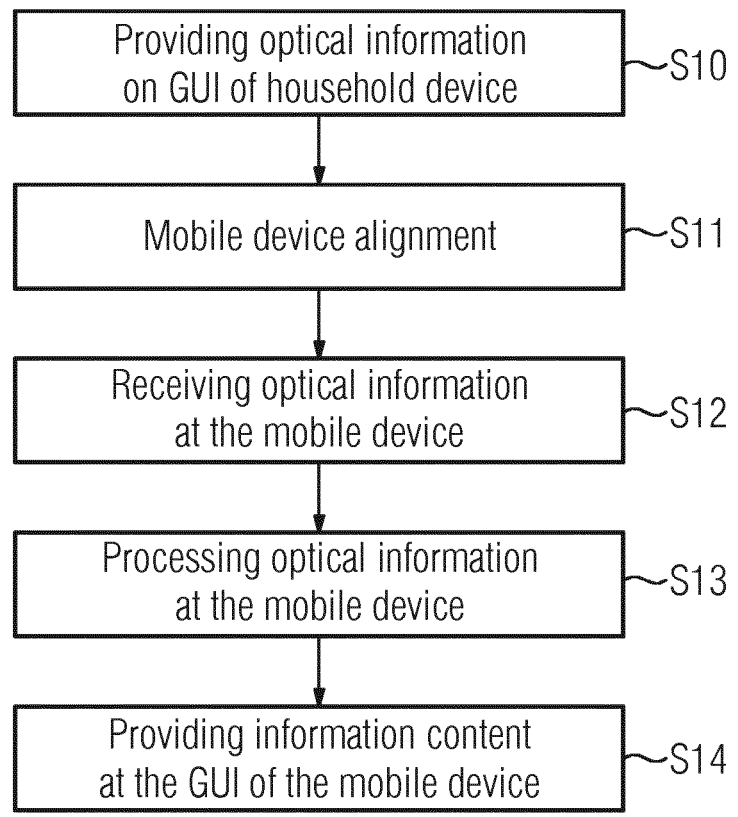
FIG. 4 illustrates a method for exchanging information between a household device and a mobile device based on a flow chart.

FIG. 4 illustrates a method for exchanging information between a household appliance 1 and a mobile device 2 based on a flowchart.

As a first step, optical information is provided at the GUI 3 of the household appliance 1 (S10). Said optical information may be provided after receiving a trigger. Said trigger may be built by starting an information provision routine at the household appliance 1, e.g. a routine for displaying error information, statistics of usage or warnings. Specifically, the trigger may comprise pushing a button or a touch field of the household appliance. However, according to other embodiments, said information provision may be started automatically after occurrence of an error or unexpected situation (leading to a warning).

In order to receive said optical information displayed at the GUI 3, the mobile device 2 is aligned based on the one or more markers 4 (S11). Said alignment may be formed such that an optical reference information ORI is positioned correctly in a portion of the GUI 5, said portion being defined by said one or more markers 4.

It is worth mentioning that a certain application (APP) of the mobile device 2 may be executed for processing/decoding the received optical information. So, before performing said alignment step, said application may be started at the mobile device 2.

After aligning the mobile device 2, optical information may be received at the mobile device (S12). More in detail, based on the camera 6, one or more images or video sequences may be captured. In case of using a specific application, said application may interact with the camera 6 in order to capture said image(s) and/or video sequences.

The exchange of information may be started by the household appliance 1 (e.g. after receiving the trigger). The information may be provided by the household appliance 1 in a coded form. Different ways of information provision may be possible. For example, a portion of the GUI 3 may provide said coded information, for example, by providing error or warning codes including letters and/or numbers. According to an embodiment, the seven segment display 8 may provide said letters and/or numbers. However, also binary coding may be possible, i.e. the seven segment display 8, one or more light emitting diodes or any optical transmitter (e.g. a certain display portion) may provide optical information by on/off switching thereby providing an optical information sequence. In case of the seven segment display 8, all segments off may be 0 and all segments on may be 1. According to other embodiments, the GUI 3 may provide a sequence of letters/numbers which comprise an information message in a coded way.

The received optical information is processed by the mobile device 2 (S13). More in detail, optical information is processed by an application installed at the mobile device 2. Said processing may comprise a decoding of the received optical information in order to derive an information message or information content. Said information processing may be performed in real time or quasi real time. Said information message or content or information derived from said information message or content (e.g. by translating the information message or content in a more complex information) may be provided at a user interface of the mobile device 2 (S14). Said user interface may be adapted to provide acoustic information (e.g. by means of a loudspeaker) or optical information (e.g. displayed at the GUI 5).

The proposed method can be used by a technician for service or maintenance purposes or by a household appliance user for receiving statistics of usage or operational information.

Figure 5:
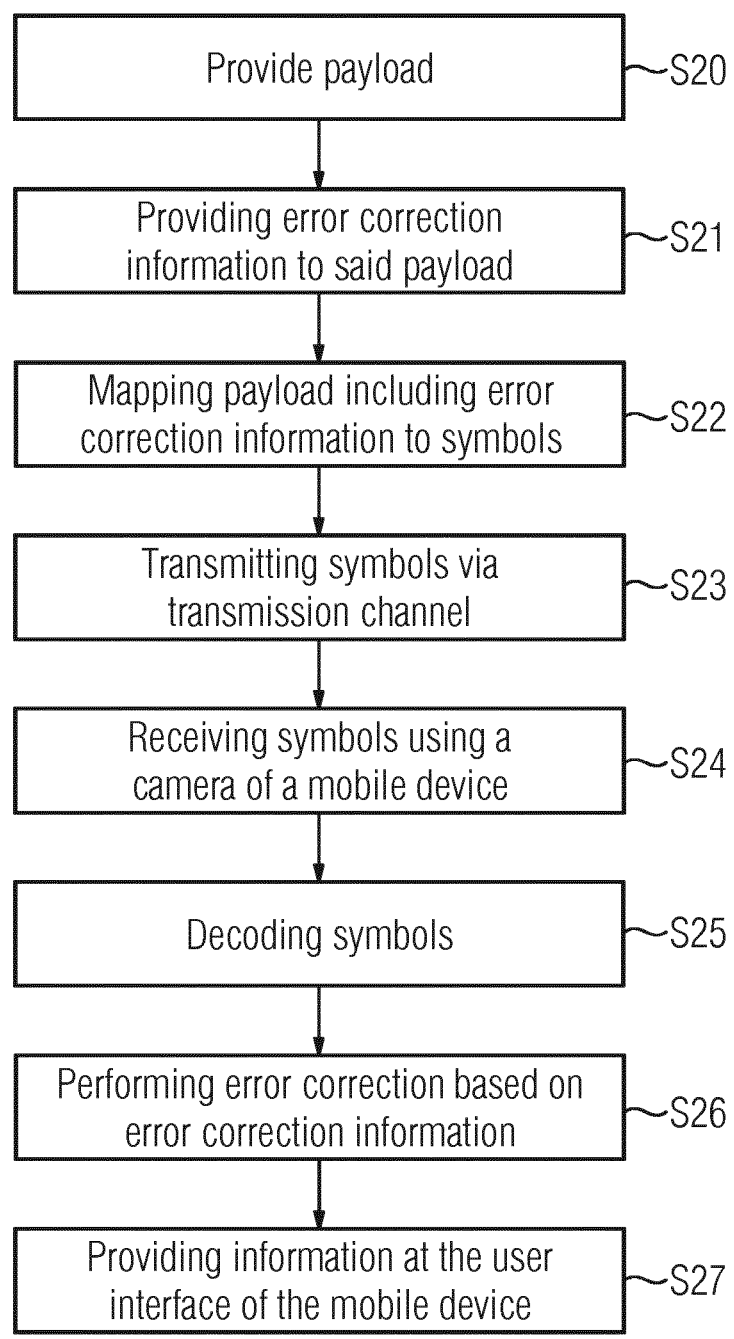
FIG. 5 shows a flow chart illustrating a sequence of steps performed for exchanging information between a household device and a mobile device.

FIG. 5 illustrates the steps performed during transmitting information from the household appliance to a mobile device and providing information at a mobile device to a technician or user of the household appliance. In the first step, payload information is provided by a control entity of the household appliance (20). Said payload information may comprise or may be information which should be received by the technician or user of the household appliance. For example, said payload information may be error information, information regarding the current state of the household appliance etc.

In order to protect payload information to be transmitted against errors appearing during transmitting said payload information through the transmission channel, an error correction scheme may be applied to the payload information (S21). More in detail, error correction information may be added to the payload information in order to be able to recover the payload information in case of transmission errors (e.g. bit failures etc.). For example, one or more error correction bits may be added to payload bits. Any error correction scheme may used. For example, a hamming code may be a preferred error correction scheme because of a low implementation complexity and a good trade-off between bit-rate and correction capability.

The payload information and the error correction information (in the following referred to as protected payload) may be mapped to a single symbol or a sequence of symbols (S22). Said symbols may be the graphical characters or digits which are provided at the user interface, preferably displayed at the GUI 3.

Said symbols may be transmitted via the transmission channel (S23). "Transmission channel" according to the present invention may comprise the recording of said one or more symbols by the camera 6 of the mobile device 2 and preferably also the receiving and recognition process of the symbols.

After receiving the symbols by means of the camera 6 (S24), the symbols may be decoded (S25). Said decoding process may comprise a recognition process of the one or more graphical symbols within the one or more images or within the video sequence captured by the camera 6. In addition, said decoding process may also comprise a transformation process of the recognized graphical symbol into one or more bits, said bits representing at least a portion of the protected payload.

After decoding the received symbols, the error correction scheme may be removed (S26). More in detail, the error correction information included in the protected payload may be used to perform error correction of the payload. Thereby transmission errors included in the protected payload can be removed.

Finally, the error-corrected payload may be transformed into information which can be directly received and understood by a human user or technician (S27). For example, said information may be graphical information provided at the GUI 5 of the mobile device 2 or audio information.

Steps S20 to S22 are performed by the household appliance, steps S24 to S27 by the mobile device and S23 partly by the household appliance and partly by the mobile device.

Figure 6:
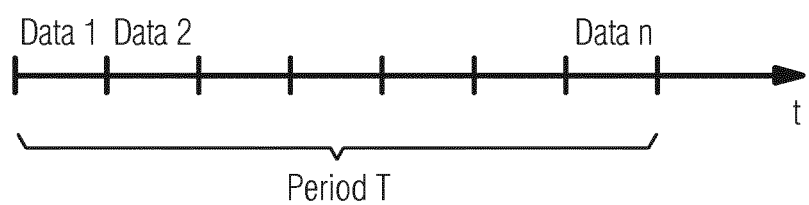
FIG. 6 illustrates the arrangement of data segments in subsequent time slots for sequentially transmitting information through the transmission channel.

For transmitting information, a time-domain spatial-multiplexing coding algorithm may be used. FIG. 6 shows a period of time T which is segmented in time slots. By using said time-domain spatial-multiplexing coding algorithm, protected payload data may be transmitted in a segmented way, i.e. data segments of protected payload data are transmitted after each other. In FIG. 6, "Data 1" and "Data 2" form such data segments. A group of data segments, in the present example n data segments (wherein n is a natural number) may represent a code word representing a certain information to be transmitted. Said n data segments cover a time period T in which the entire code word is transmitted.

Figure 7:
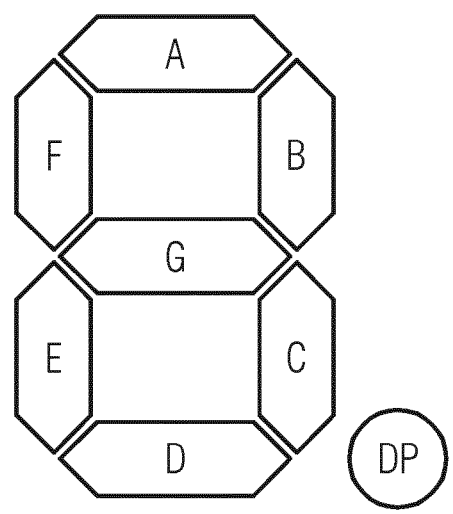
FIG. 7 illustrates a seven segment display comprising seven bar-shaped portions and a dot.

FIG. 7 shows a seven-segment display comprising seven bars A to G for displaying an optical symbol and a dot DP. Using a seven-segment display, the bars A to G can be used for creating a code word based the information which bar A to G is on or off. For example, all bars A to G can be used for creating the bits of the code word. Alternatively, only a first subset of bars may be used for creating the bits of the code word and a second subset of information may be used for recognizing the spatial alignment of the seven-segment display in the captured optical information.

The dot DP may be used for synchronization issues. More in detail, the dot DP may be switched on/off according to a certain pattern in order to achieve a synchronization of the data processing of the mobile device 2 with respect to the data provision at the GUI 3 of the household appliance. However, also other bars/segments of the seven segment display 8 may be used for synchronization. For example, the digital encoding may be chosen such that two consecutive symbols are always different. Thereby, the synchronization can be obtained based on the flipping of the symbols itself.

Figure 8:
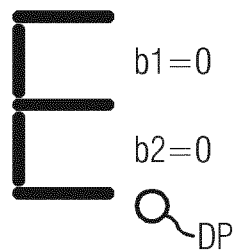
FIG. 8 illustrates a first symbol provided by the seven segment display providing a first tuple of bits.
Figure 9:
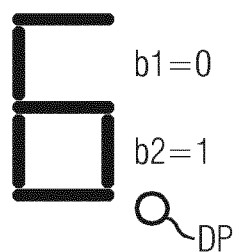
FIG. 9 illustrates a second symbol provided by the seven segment display providing a second tuple of bits.

FIGS. 8 and 9 show the provision of digital information by means of a seven-segment display according to an example. A first subset of bars of the seven-segment display 8 provided at the household appliance 1 may be used for recognizing the spatial alignment of said display within the captured information. According to the embodiment of FIG. 7, the bars A, D, E, F, G (forming an "E") may be used for recognizing the spatial alignment. For example, the first subset of bars may be continuously switched on during the whole period of information provision. Based on the first subset of bars it is possible to achieve a certain alignment of the mobile device 6 with respect to the GUI 3 of the household appliance 1, respectively to recognize the spatial alignment of the seven-segment display within the optical information captured by the camera 6. More in detail, based on the first subset of bars it may be possible to align the mobile device 2, e.g. by changing the position of the mobile device, respectively, the zoom factor such that the first subset of bars matches with a corresponding alignment information (e.g. marker 4) provided at the GUI 5 of the mobile device 2.

Thus, the first subset of bars may build upper-mentioned optical reference information (ORI).

The remaining bars may form a further subset of bars which is used for providing said protected payload information at the seven-segment display 8. In the present example, the bars B and C according to FIG. 7 are used for providing said protected payload information.

The time-variant switching of the bars of the further subset of bars may be used for coded transmission of protected payload information. According to the present example, two bits of information are transmitted in a data segment provided in a time slot according to FIG. 6. Depending on the switching of the bars B, C according to FIG. 7, the following bit tuples are possible: (b1=0 b2=0); (b1=0 b2=1); (b1=1 b2=0) and (b1=1 b2=1), wherein FIG. 8 shows a symbol representing bit tuple (b1=0 b2=0) and FIG. 9 shows a symbol representing bit tuple (b1=0 b2=1).

Supposing that a code word comprises 4 bits of payload and 4 bits of error correction information, a sequence of 4 symbols have to be displayed at the GUI 3 of the household appliance 1, captured by the camera 6 and processed in order to receive the code word at the mobile device 2.

Figure 10:
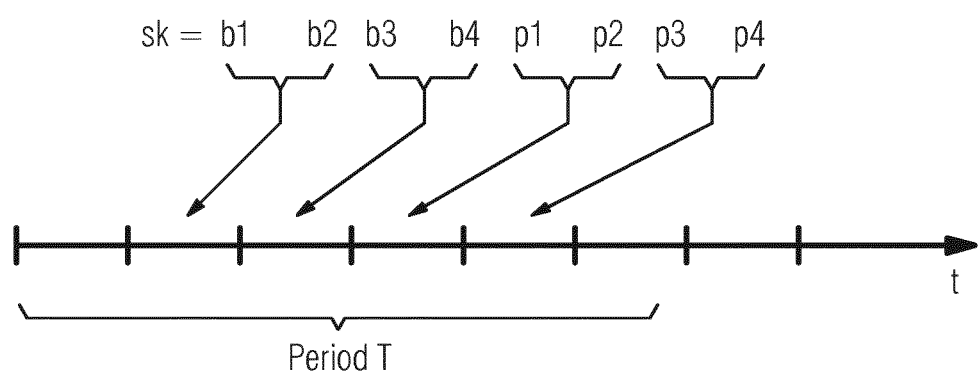
FIG. 10 illustrates the arrangement of bit tuples in a frame structure comprising multiple consecutive timeslots.

FIG. 10 shows the arrangement of the bit tuples of such code word wherein the bits b1 to b4 represent payload bits and bits p1 to p4 represent error correction information. By transmitting payload information by displaying four symbols in subsequent time slots at the GUI 3 of the household appliance 1, corresponding bit tuples (b1, b2) (b3, b4) (p1 p2) and (p3 p4) are transmitted in time-spreaded way. After the period of time T (in the present case spanning four timeslots), one code word is received at the mobile device.

In order to fulfill the Nyquist criterion, the sampling rate of the camera 6, i.e. the image capturing frequency should be at least twice the symbol rate at which symbols are provided at the GUI 3 of the household appliance 1. For example, in case that the camera 6 is able to record 24 images per second, a time division multiplexing scheme with at least 12 time slots per second has to be performed.

The bit transmission rate of payload information can be determined based on the following formula:

$$\text{bit}_{PL}/\text{sec}=\text{fps}*\text{symbols/timeslot}*\text{bits/symbol}*\text{bit}_{PL}/\text{bit}_{enc};$$

wherein $\text{bit}_{PL}/\text{sec}$: is the bit rate of payload bits;

fps: is the time slot rate (time slots per sec);

symbols/timeslot: is the number of symbols per time slot;

$\text{bit}_{PL}$: number of payload bits included in a code word;

$\text{bit}_{enc}$: number of encoded bits included in a code word.

Referring to the embodiment described before with respect to FIGS. 8 to 10 and assuming a time slot rate of 12 time slots/sec, the bit rate of payload bits may be 12 bits/sec.

The embodiment described before only uses two bars of the seven-segment display for data transmission. However, it may be possible to use up to seven bars for data transmission thereby increasing the payload bit rate.

In the following, the application running at the mobile device is described in further detail. As mentioned before, the application is adapted to capture a sequence of images or a video sequence with a capturing rate which is adapted to the symbol rate of symbols displayed at the GUI 3 of the household appliance 1.

In addition, the application has to identify and decode the symbols within the images captured by the camera 6. For example, the application may use a symbol recognition routine for determining which symbol has been captured by the camera. Said symbol recognition routine may, for example, use an OCR (optical character recognition) algorithm for determining the symbol. After symbol determination, the application may translate the recognized symbol in a bit sequence associated with the recognized symbol. Thereby the protected payload is recovered.

Said protected payload may be translated into payload information by performing error correction based on the error correction information included in the protected payload.

Finally, the payload information which forms a code word or a portion of the code word may be translated in information which can be interpreted by the human user. The information may be provided at the user interface, for example at the GUI 5 of the mobile device 2.

It should be noted that the description and drawings merely illustrate the principles of the proposed method and household appliance. Those skilled in the art will be able to implement various arrangements that, although not explicitly described or shown herein, embody the principles of the invention.

LIST OF REFERENCE NUMERALS

1 household appliance
2 mobile device
3 graphical user interface (of household appliance)
4 marker
5 graphical user interface (mobile device)
6 camera
7 marking
8 seven segment display
9 logo
DP dot
ORI optical reference information
T time period

The invention claimed is:

1. A method for exchanging information between a household appliance and a mobile device, the method comprising the steps of:
providing optical information at a graphical user interface of the household appliance, which comprises a seven-segment display;
aligning the mobile device with respect to the household appliance based on one or more markers displayed at a graphical user interface of the mobile device, wherein a first subset of bars of said seven segment display is used for providing optical reference information used for alignment purposes;
receiving the optical information at the mobile device by capturing said optical information provided at the household appliance by a camera of the mobile device;
processing said received optical information at the mobile device in order to derive an information message included in said received optical information;
providing said information message or information associated with said information message at the user interface of the mobile device.

2. The method according to claim 1, wherein said one or more markers comprise a frame or segments of a frame.

3. The method according to claim 1, wherein said one or more markers are corner markers.

4. The method according to claim 1, wherein the step of aligning comprises capturing of an optical reference information at the household appliance by means of said camera of the mobile device and arranging the mobile device and/or performing a zoom action at the mobile device such that said optical reference information is displayed at the graphical user interface of the mobile device and said optical reference information is fitted into said one or more markers.

5. The method according to claim 4, wherein said optical reference information comprises a fixed area of the graphical user interface of the household appliance or reference information temporarily displayed at the graphical user interface of the household appliance.

6. The method according to claim 4, wherein the optical reference information is built by a fixed, permanently existent marking.

7. The method according to claim 1, wherein during said aligning step, a portion of said graphical user interface of the household appliance, which shows said optical information, is displayed at the graphical user interface of the mobile device and is fitted into an area of said graphical user interface of the mobile device, said area being defined by said one or more markers.

8. The method according to claim 6, wherein said fixed, permanently existent marking is fitted into an area of the graphical user interface of the mobile device which is defined by said one or more markers.

9. The method according to claim 1, wherein said optical information displayed at said graphical user interface of the household appliance is time-invariant.

10. The method according to claim 1, wherein said optical information displayed at the graphical user interface of the household appliance includes time-varying information.

11. The method according to claim 1, wherein said optical information received by the camera is processed in real time or quasi-real time into digital information.

12. The method according to claim 1, wherein the seven segment display of the graphical user interface is adapted to display one or more digits or one or more light emitting diodes which are used for providing said optical information.

13. The method according to claim 1, wherein said derived information message comprises information regarding error codes, warnings or usage statistics.

14. The method according to claim 1, wherein processing said received optical information is started manually or automatically after aligning the mobile device.

15. The method according to claim 1, wherein said optical information comprise a sequence of digitally coded information including error correction information.

16. The method according to claim 1, wherein said optical information comprises a sequence of digitally coded information which is transmitted based on a frame structure comprising multiple time slots in which data segments of the digitally coded information are transmitted.

17. A method for exchanging information between a household appliance and a mobile device, the method comprising the steps of,
providing optical information at a graphical user interface of the household appliance;
aligning the mobile device with respect to the household appliance based on one or more markers displayed at a graphical user interface of the mobile device, or based on a time-invariant portion of provided optical information;
receiving the optical information at the mobile device by capturing said optical information provided at the household appliance by a camera of the mobile device;
processing said received optical information at the mobile device in order to derive an information message included in said received optical information;
providing said information message or information associated with said information message at the user interface of the mobile device,
wherein information processing at the mobile device is synchronized to the information provision at the household appliance based on a dot-shaped portion of a seven segment display.

18. The method according to claim 17, wherein a first subset of bars of the seven segment display of the graphical user interface of said household appliance is used for providing optical reference information which is used for alignment purposes.

19. The method according to claim 18, wherein a second subset of bars of said seven segment display is used for providing digitally coded information at the graphical user interface of the household appliance.

20. The method according to claim 18, wherein one digit of the seven segment display provides two or more bits of digital information in a time slot of said frame structure.

21. A household appliance comprising a graphical user interface for providing optical information, the household appliance being adapted to exchange information with a mobile device according to the a method comprising the steps of:
providing optical information at a graphical user interface of the household appliance, which comprises a seven-segment display;
aligning the mobile device with respect to the household appliance based on one or more markers displayed at a graphical user interface of the mobile device, wherein a first subset of bars of said seven segment display is used for providing optical reference information used for alignment purposes;
receiving the optical information at the mobile device by capturing said optical information provided at the household appliance by a camera of the mobile device;
processing said received optical information at the mobile device in order to derive an information message included in said received optical information; and
providing said information message or information associated with said information message at the user interface of the mobile device.

* * * * *